(12) United States Patent
Azzalin et al.

(10) Patent No.: US 7,246,980 B2
(45) Date of Patent: Jul. 24, 2007

(54) FIXING MEMBER COMPRISING AN INTEGRITY CONTROL SYSTEM

(75) Inventors: Graziano Azzalin, Oleggio (IT); Christophe Korn, Ferrera di Varese (IT); Andre Poucet, Cittiglio (IT); Marco Sironi, Laveno Mombello (IT)

(73) Assignee: European Community (BE)

(*) Notice: Subject to any disclaimer, the term of this patent is extended or adjusted under 35 U.S.C. 154(b) by 0 days.

(21) Appl. No.: 10/533,495

(22) PCT Filed: Aug. 7, 2003

(86) PCT No.: PCT/EP03/50368

§ 371 (c)(1),
(2), (4) Date: Mar. 17, 2006

(87) PCT Pub. No.: WO2004/040151

PCT Pub. Date: May 13, 2004

(65) Prior Publication Data

US 2006/0198713 A1    Sep. 7, 2006

(30) Foreign Application Priority Data

Oct. 30, 2002 (EP) .................................. 02292700

(51) Int. Cl.
*F16B 41/00* (2006.01)
*G09F 3/00* (2006.01)

(52) U.S. Cl. .................. 411/396; 411/911; 411/14; 292/327; 340/652

(58) Field of Classification Search ............ 411/396, 411/940, 911, 2, 14; 292/327; 340/652
See application file for complete search history.

(56) References Cited

U.S. PATENT DOCUMENTS

| RE30,183 | E | * | 1/1980 | Popenoe ................... 73/761 |
| 4,329,681 | A | * | 5/1982 | Parsons ................. 340/545.6 |
| 4,602,903 | A | * | 7/1986 | Wilburn ................... 411/222 |
| 4,711,368 | A | * | 12/1987 | Simons ................. 340/545.6 |
| 4,713,506 | A | * | 12/1987 | Klink ....................... 200/507 |
| 4,921,380 | A | * | 5/1990 | Tronetti, Jr. ............... 411/8 |
| 5,479,799 | A |   | 1/1996 | Kilman et al. |

(Continued)

OTHER PUBLICATIONS

International Search Report; PCT/EP03/50368; Nov. 5, 2003.

*Primary Examiner*—Flemming Saether
(74) *Attorney, Agent, or Firm*—Cantor Colburn LLP

(57) ABSTRACT

The invention concerns a fastening member comprising a threaded part (150) and a head (100) with which the threaded part can be turned in order to tighten the fastening member in a corresponding element. The head (100) is formed of a plate (110) in one piece with the threaded part (150) and a cap (120) covering said plate. The cap (120) comprises a recessed portion (121) in which an offset is provided to form a housing (128). The plate (110) comprises a guide finger (111) located inside the housing (128) to form a stop against which the cap presses in order to impart a rotational movement to the plate in the tightening direction. The cap (120) further comprises a remotely interrogatable electronic component (130) comprising a data storage means (132). Said component is held in the recessed portion (121) with its end (133) protruding into the housing (128) so as to strike against the guide finger (111) and cause the fracture of the component when any attempt is made to unscrew or untighten the fastening member.

12 Claims, 4 Drawing Sheets

U.S. PATENT DOCUMENTS 5,791,848 A * 8/1998 Lanham ................. 411/373
6,843,628 B1 * 1/2005 Hoffmeister et al. ......... 411/14

2002/0044063 A1   4/2002  Blagin et al.

* cited by examiner

FIXING MEMBER COMPRISING AN INTEGRITY CONTROL SYSTEM

FIELD OF THE INVENTION

The present invention concerns a fastening member of the screw or pin type the integrity of which can be verified electronically.

BRIEF DESCRIPTION OF RELATED ART

There are many solutions, both electronic and mechanical, for guaranteeing the integrity and checking for Unauthorized manipulation of substances (e.g. noxious, radioactive, etc.) during storage or transport. There are also solutions for verifying whether systems, such as motors, aircraft parts or similar, have been accessed or manipulated without authorization.

The technologies employed for applying seals are very varied, and depend mainly on their use and the degree of security required.

Thus, when the aim is simply to ensure the integrity of an object such as a container or a trunk, the function of the seal is to guarantee that the object has not been opened without authorization. In this case, inexpensive devices such as simple plastic or metal collars fixed to the opening device of the object may suffice. Simple visual inspection of the integrity of the structure of the collars is then all that is needed to determine whether the seal has been forced or not.

On the other hand, there are more and more areas in which seals not only have to fulfil their basic function of testifying to the inviolate state of the object, but must also be able to supply information during use. Thus, devices are currently available which comprise mechanical sealing means with associated electrical or optical means capable of memorising and transmitting information.

For example, patent application US 2002/044063 describes a fastening member comprising a threaded part and a head by means of which the threaded part can be turned in order to tighten the fastening member in a corresponding element. The head is formed of a plate in one piece with the threaded part and a cap covering the plate. The cap comprises a recessed portion in which an offset is provided to form a housing. The cap further comprises a remotely interrogatable electronic component which comprises a data storage means.

However, currently available sealing devices that comprise electronic means are complex and costly. They are generally designed for a specific purpose and cannot be used with any type of object at will. Furthermore, they are fragile in their mechanical structure, which makes them very vulnerable during handling and transport, a factor that places further restrictions on their use.

PURPOSE AND BRIEF SUMMARY OF THE INVENTION

It is the purpose of the present invention to remedy the drawbacks mentioned above and to produce a fastening member that comprises a checkable integrity system, with multiple applications, and is inexpensive although mechanically robust. The integrity of the device must be reliably and easily checkable. In addition, the device must be able to contain information that can be easily and quickly queried.

These objectives are achieved by a fastening member comprising a threaded part and a head by means of which the threaded part can be turned in order to tighten the fastening member in a corresponding element, said head being formed of a plate in one piece with the threaded part and a cap covering said plate, the cap comprising a recessed portion including an offset provided to form a housing, and the cap further comprising a remotely interrogatable electronic component which comprises a data storage means. An important aspect is that the plate comprises a guide finger extending vertically from the side opposite the threaded part, the finger being arranged inside the housing to form a stop against which the cap presses in order to rotate the plate in the tightening direction, and said component is held in the recessed portion as a protrusion in the housing so as to come to a stop against the guide finger when an attempt is made to untighten the fastening member.

In this way, by means of the fastening member according to the invention, the electronic component, which is able to memorize and transmit information, also becomes the integrity indicator of the member. Verification of the integrity of the component is effected by remote interrogation of the latter, without the need to dismantle the member.

According to a characteristic of the invention, the member comprises a ring, which cooperates with first and second grooves provided in the plate and the cap respectively to hold the cap in an axial position on the plate.

The fastening member may further comprise a holding element for holding the electronic component in its housing.

To prevent the guide finger from striking against the component at the wrong time, the cap may further comprise a shear pin arranged in the housing between the end of the component protruding into the housing and the guide finger. Similarly, the plate may display a slightly elliptical shape in order to block rotation of the cap when no tightening or untightening force is applied.

According to a particular aspect of the invention, the cap is made of PVC and the threaded part and the plate are stainless steel.

According to another particular aspect, the electronic component is a passive-type transponder or a transponder comprising power supply means.

The data storage means of the electronic component may comprise data encryption means and be of programmable or multi-page type.

According to a particular embodiment of the invention, the fastening member further comprises a second remotely interrogatable electronic component, this additional component being located in the cap outside the recessed portion. Thus even after the destruction of the first component, there will still be means to read the data in the fastening member.

BRIEF DESCRIPTION OF THE DRAWINGS

Other characteristics and advantages of the invention will become apparent from the following description of particular forms of embodiment, given, by way of non-limiting examples, with reference to the attached drawings, in which.

DETAILED DESCRIPTION OF FORMS OF EMBODIMENT OF THE INVENTION

In order to avoid unnecessarily complicating the description, the present invention will be described essentially in relation to a fastening member of screw bolt type. However, it will be clearly apparent that the present invention can be applied to any other type of fastening member that is put in place by tightening.

Figure 1:
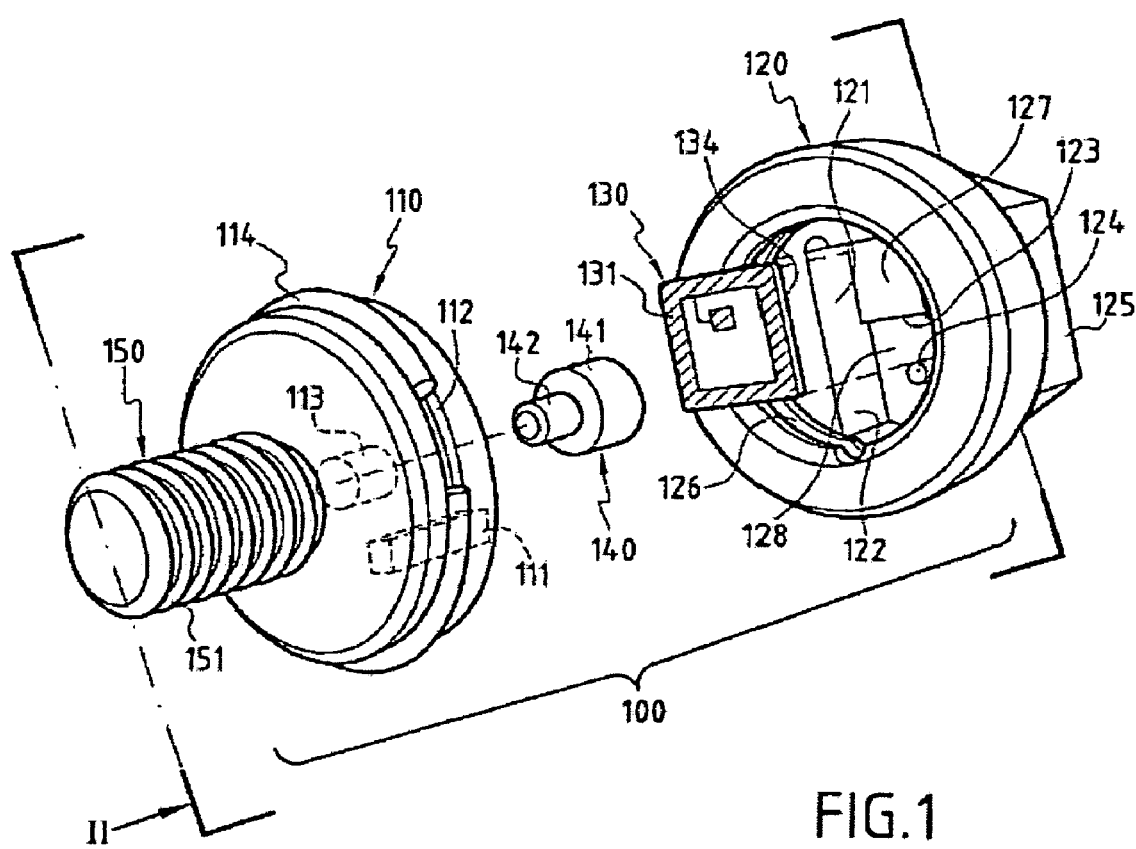
FIG. 1 is an exploded perspective view of a fastening member according to the present invention.

FIG. 1 shows the different elements that make up a form of embodiment of a fastening member according to the invention.

In this embodiment, the fastening member comprises a protruding part 150 comprising a screw thread 151 designed to cooperate with a nut or machined thread in a component or structure. The fastening member further comprises a head 100 formed principally of a plate 110 in one piece with the threaded part 150 and a cap 120 which is assembled with the plate and entirely covers it so as to form the external part of the head of the fastening member. For this purpose, the cap 120 comprises an upper part 125 of hexagonal shape able to cooperate with a tightening device such as a spanner or wrench. The shape of the upper part 125 of the cap may vary greatly. It will depend on the function of the fastening member (e.g. closure, clamping, braking, etc.) and on the tightening devices with which it cooperates. Thus the upper part 125 may, for example, take the shape of a prism (hexagonal or square) or even a cylinder or a spherical dome provided with a driving recess.

Figure 2:
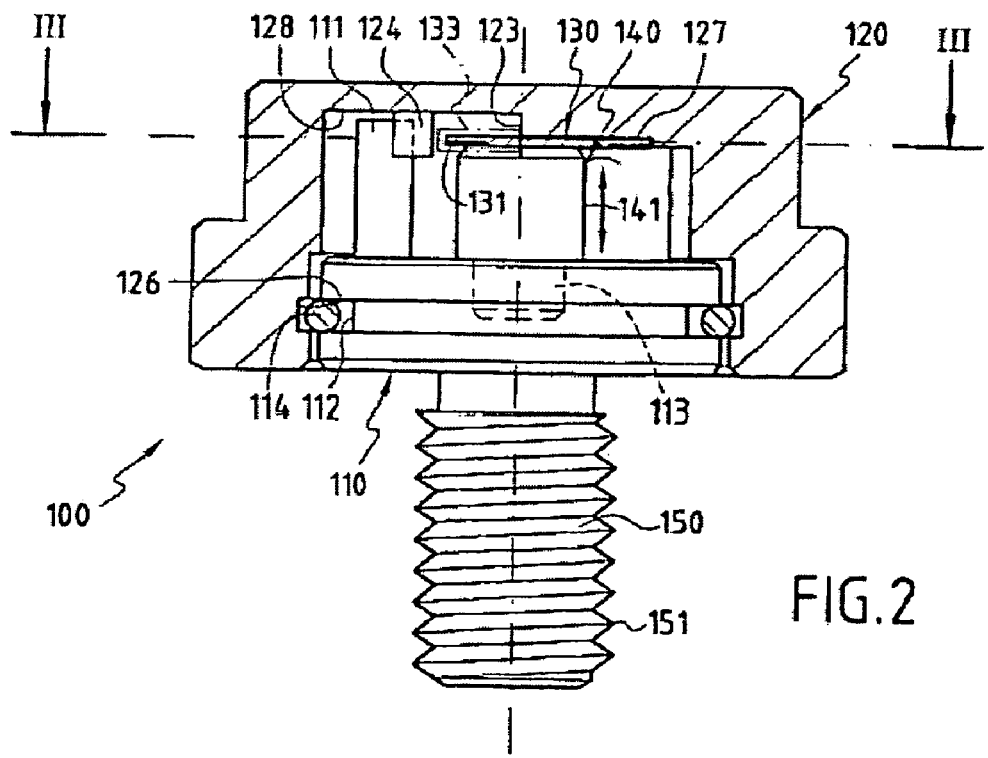
FIG. 2 is a diagrammatic view of a fastening member according to the invention in a cross-section through the plane II in FIG. 1.

According to the invention, the cap 120 is arranged to be able to accommodate an electronic component 130. For this purpose, a recess 121 is machined in the interior of the cap in order to form a housing for the component 130. Part of the bottom of the recess is further machined to form an offset delimiting a portion 128 deeper than the unmachined portion 127. In this embodiment, the electronic component 130 is held against the portion 127 of the recess 121. The portion 127, however, is less in length than the electronic component 130, so that once in contact with the bottom of the portion 127, a part 133 of the component stands out or protrudes into the portion 128, as shown in FIG. 2.

To ensure that the electronic component 130 is held in place in the cap, it is glued to the bottom of the portion 127. Holding of the component may also be reinforced by a spreader 140, held in compression against the component. In the embodiment considered here, the spreader 140 is formed of a piston 142 which, when in compression, exerts a thrust force against a pusher 141. To this end, the plate 110 comprises a cavity 113 to accommodate the piston 142 of the spreader 140, the cavity 113 being less in depth than the height of the piston 142 when in rest position. Consequently, when the cap 120 is assembled on the plate 110, as shown in FIG. 2, the spreader 140, which is in compression between the two elements, exerts a supporting force on the electronic component 130 capable of ensuring that the latter remains in place in the event of failure of the adhesive over time, for example.

To keep the cap 120 in place on the plate 110, a holding ring 114 is partly contained in a groove 112 machined in the periphery of the plate 110. The part of the holding ring 114 that protrudes from the groove 112 is used to position the cap on the plate by means of a groove 126 machined in the cap 120. Thus, as shown in FIG. 2, the groove 126 of the cap 120 engages with the holding ring 114, ensuring the retention of the cap on the plate. Any other holding device that is able to retain the cap in the axial direction while leaving it free to rotate in relation to the plate may be used.

Figure 3A:
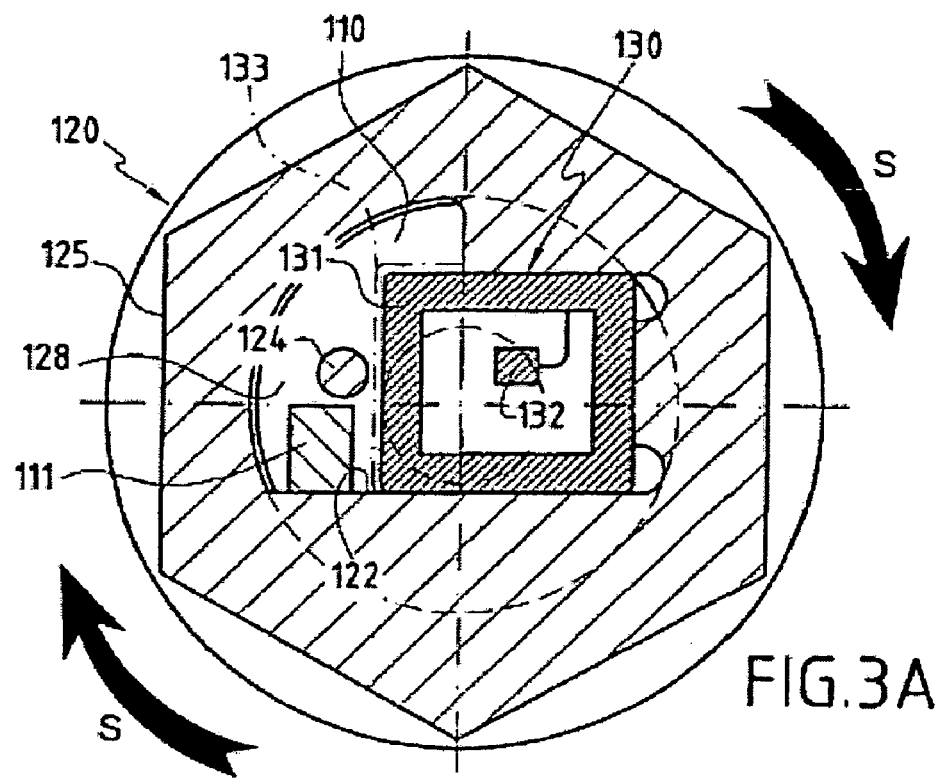
FIG. 3A is a diagrammatic view of a fastening member according to the invention in a cross-section through the plane III in FIG. 2 when a tightening effort is applied to it.

Since the cap 120 is free to rotate with respect to the plate, a guide finger 111 is fixed to the upper surface of the plate 110 to impart a rotational movement to the plate when the cap is turned in the tightening direction. The guide finger 111 then forms a stop against which the edge 122 of the recess 121 in the cap presses to turn the plate in the tightening direction. This embodiment is illustrated in FIG. 3A, which shows that when a tightening effort is applied in direction S, the edge 122 of the cap 120 comes into contact with the guide finger 111 which then transmits to the plate 110 the rotational effort applied to the cap. By this means, the fastening member can be tightened in the same way as an ordinary screw.

In the present invention, the aim was to produce a fastening member of which the integrity could be verified quickly and without dismantling. To achieve this, the electronic component 130 is used as an indicator of this integrity. It works as follows: since the electronic component can be remotely interrogatable, if it has been physically damaged so that it can no longer be interrogatable, this makes it possible to establish whether the device has been manipulated without authorization. In other words, the integrity of the fastening member according to the invention is revealed by the mechanical, and consequently electronic, integrity of the electronic component.

More specifically, the guide finger 111 extends vertically on the side opposite the threaded part 150 and is slightly less in height than the depth of the portion 128 when the cap is positioned on the plate. Referring to FIG. 2, it can be seen that the end of the guide finger present in the portion 128 is situated above the end 133 of the component that protrudes into this portion. Consequently, part of the guide finger 111 will come into contact with the end 133 of the component when the cap is turned in the unscrewing or untightening direction. Thus, according to the principle of the invention, any attempt to unscrew the fastening member will lead to fracture of the component.

As shown in FIG. 1, the electronic component 130 is formed of a substrate 133 on which are arranged an electronic chip 132 and an antenna 131. The antenna 131 is formed of a winding that extends all round the substrate. One end of this winding is connected to the electronic chip 132. The chip 132 basically comprises an electronic data storage circuit accessible for reading and, if necessary, for writing. The reading and possible writing of data in the storage circuit are effected by radio-frequency transmission, in particular via the antenna 131. If the winding constituting the antenna 131 is broken, the antenna becomes inoperative, and no further transmission can take place between the electronic chip 132 and the surroundings, indicating that damage has been done to the electronic component 130 and therefore that tampering has taken place.

Figure 3B:
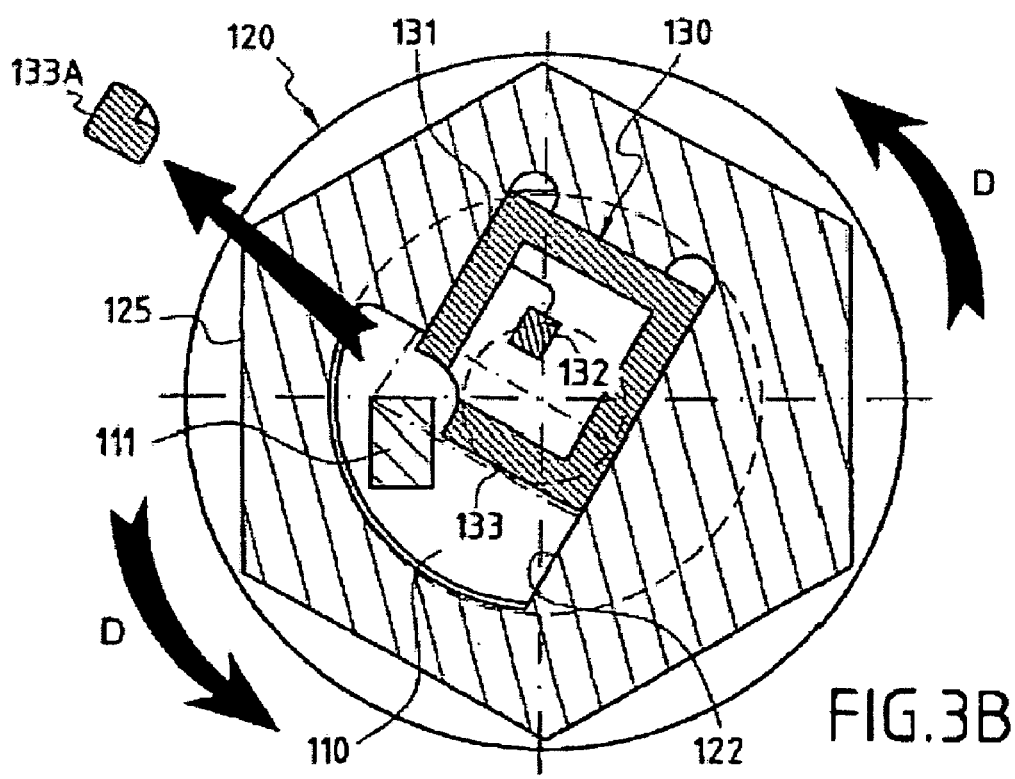
FIG. 3B is a diagrammatic view of a fastening member according to the invention in a cross-section through the plane III in FIG. 2 when a untightening effort is applied to it.

FIG. 3B illustrates such tampering. When an attempt is made to unscrew the fastening member by application of an effort D in the unscrewing or untightening direction to the cap 120, the guide finger 111 comes up against the end 133 of the electronic component 130 that protrudes into the portion 128. A fragment 133A is then broken off the component. The separation of the fragment 133A is equivalent to the rupture of the antenna 131 and thus prevents all further transmission with the electronic chip 132. Consequently, it is necessary to ensure that the electronic component 130 extends far enough into the housing 128 for a fragment of the component to be broken off by the guide finger 111, causing rupture of the antenna.

An example of an electronic component that can be used in the fastening member according to the invention is a model of transponder (Ario 10/R/0 or Ario 40 R/W) by the TAGSYS company, which is made in the shape of a square of side 13.6 mm and 1 mm thick, with a storage capacity of 2 KBits. This is a passive type of transponder, meaning that the antenna is used not only for transmission of data, but also to receive an activation field for the supply of electrical energy to the electronic circuit of the chip. The storage of the electronic circuit contains, in particular, a unique code, which serves to identify the fastening member.

Figure 4:
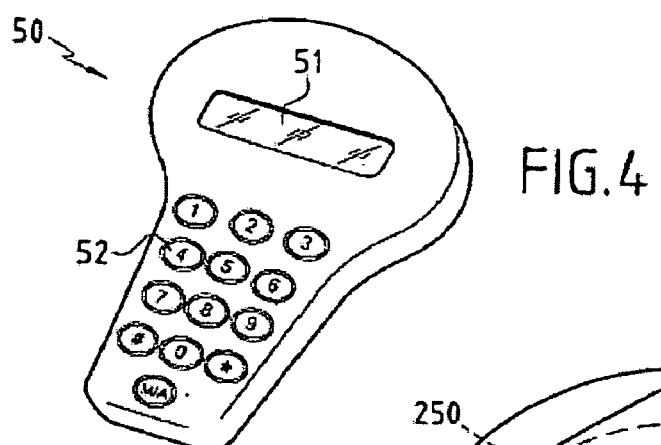
FIG. 4 is a perspective view of an example of a portable reader.

Reading of the data stored in the transponder memory, such as the identity of the fastening member or information regarding the associated substance or system, can be performed, for example, by means of a portable reader 50 shown in FIG. 4. As an example, a portable reader known under the name "MEMOR 2000", by the MINEC company, can be used for power supply and data reading with the transponder on a frequency of 13.56 MHz. Such a reader comprises a display screen 51, a keypad 52 and/or queried data storage means. The reader activates the transponder on a radio-frequency (RF), for example 13.56 MHz. This wave charges a capacitance in the transponder circuit. When the latter discharges, it sends to the reader a code or an item of information written in the memory of the transponder.

The code and/or information from each transponder interrogatable is thus sent to the reader 50 and displayed on the screen 51 and/or stored in its memory, or transferred via a serial link to a computer. Software can establish a correlation between the identification number of the fastening member (i.e. the transponder code) and assorted data such as, for example, the place and/or name of the inspector who installed the member and/or the date when it was installed. The system thus constituted enables reading of data from a distance of up to about 30 cm, which is sufficient for most applications.

Alternatively, in the case of a fixed inspection point, it is possible to use a variety of different types of non-portable readers equipped with antenna geometries enabling reading at greater distances.

The type of transponder described above is peculiarly well adapted to the present invention, as such components display very compact dimensions, enabling their easy incorporation in the heads of fastening members such as screws. Furthermore, as the substrate of the component is made of a fragile material such as silicon, it is easily broken, so that the destruction of the component, or at least of its antenna, can be effected against little resistance.

It is also possible to use, for the electronic component 130, transponders comprising a self-contained power supply, such as an accumulator, linked to the electronic chip 132 to provide its energy supply. In this case, a supplementary housing must be provided in the cap to enable incorporation of the power supply.

Thus the design of the fastening member according to the invention enables its integrity to be verified by a very simple, rapid method, although it is not visible. What happens is that any attempt at untightening or unscrewing the fastening member is penalized by the mechanical destruction of the component. In this way, the integrity of the component, and in consequence of the fastening member, can be checked by the use of a reader. If the component does not respond to interrogation by the reader, this means that it has been damaged, so that the integrity of the member is in doubt.

To act as a guide for the positioning of the cap 120 on the plate 110 when the fastening member is assembled, a shearable pin 124 (FIGS. 1 and 2) can be fitted in the portion 128. Specifically, the pin 124 is placed at a predetermined distance from the edge 122 so as to provide a space to accommodate the end of the guide finger 111. In this way, the presence of the pin will not only facilitate positioning of the cap, but will also protect the electronic component 130 from untimely impact against the guide finger if the fastening member is subjected to vibrations or shocks (during transport, handling, etc.) not caused by attempted tampering. The pin 124 must be shearable so that it does not prevent fracture of the component during attempted untightening or unscrewing of the member. For example, the pin may be made of a weaker material than that of the guide finger, or may comprise a nick to facilitate breaking.

Figure 5:
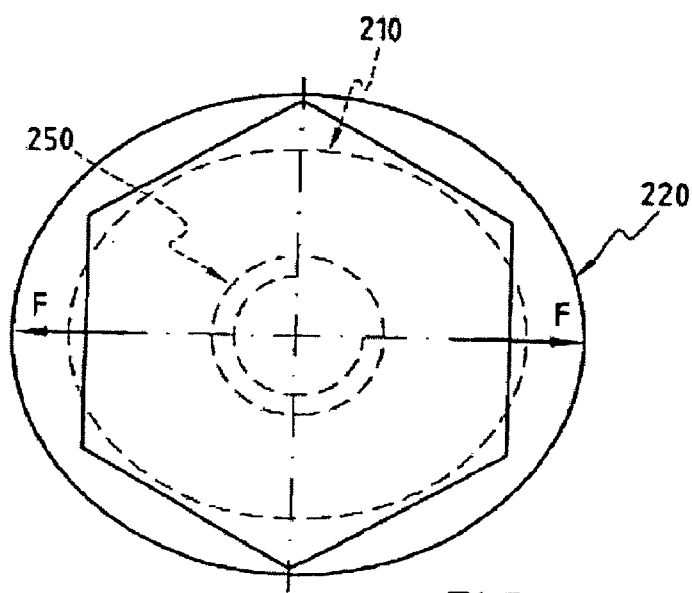
FIG. 5 is a diagrammatic view of a variant form of embodiment of the fastening member according to the invention.

Alternatively, if the cap is made of a deformable material, such as PVC, for example, the plate may be made slightly elliptical, in order to counter the rotational slipping of the cap on the plate. In the illustration in FIG. 5, a plate 210 displays a slightly elliptical shape, so that when a cap 220 of deformable material is arranged on it, it generates two contact forces F corresponding to the respective points of contact at the two extremities of the abscissa of the ellipse. Free rotation of the cap on the plate is then limited by the contact forces F, which prevent untimely contact between the component and the guide finger.

According to a characteristic of the invention, the plate and the threaded part can be made of stainless steel, while the cap is PVC. In more general terms, any substance that does not hinder the passage of electromagnetic waves, especially at the frequency of 13.56 MHz, can be envisaged as a material for the cap, which could be made, for example, out of Teflon, nylon or fiberglass.

Figure 6:
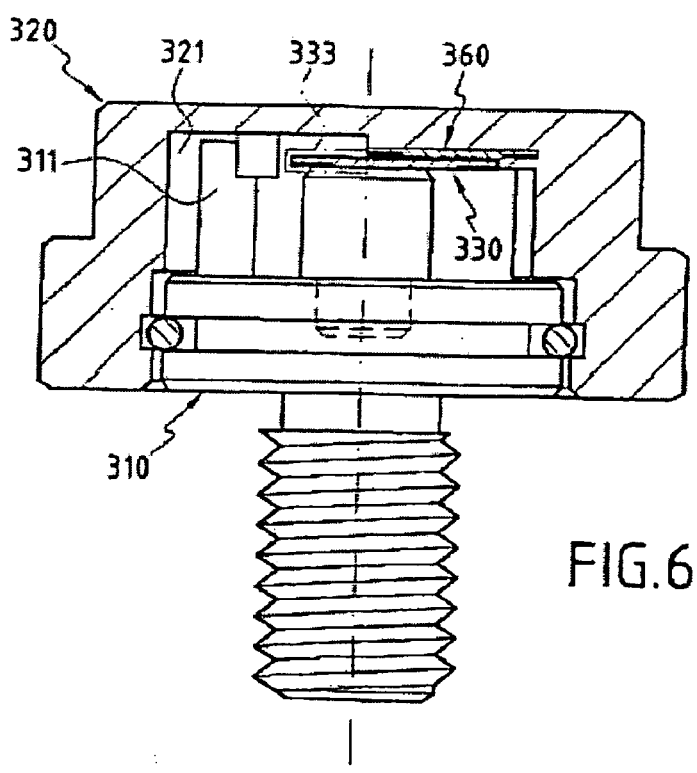
FIG. 6 is a diagrammatic view in cross section of a variant of the fastening member in FIG. 1 comprising an additional component.

In cases where it is desired to check the integrity of the fastening member and at the same time continue to read data relating to the member, even in the case of unauthorized tampering, it is possible, in a second variant of embodiment, to include a second component that can be remotely interrogatable, of the same type as the electronic component 130. This additional component must be located in a zone of the head which is out of the way of the guide finger, so that it is protected during manipulations of the member. An example of this variant form of embodiment is illustrated in FIG. 6, which shows a fastening member identical to that presented in FIGS. 1 and 2, except for the addition of a second component 360 positioned in the upper part of the cap 320 so as to be protected from the guide finger 311, which is designed to break the first component 330 in case of an untightening attempt. The bottom of the recess 321 in the cap is then machined to provide further a housing to accommodate this supplementary component. Any other location in the cap that is out of the path of travel of the guide finger and designed to accommodate this supplementary component could be used.

Figure 7:
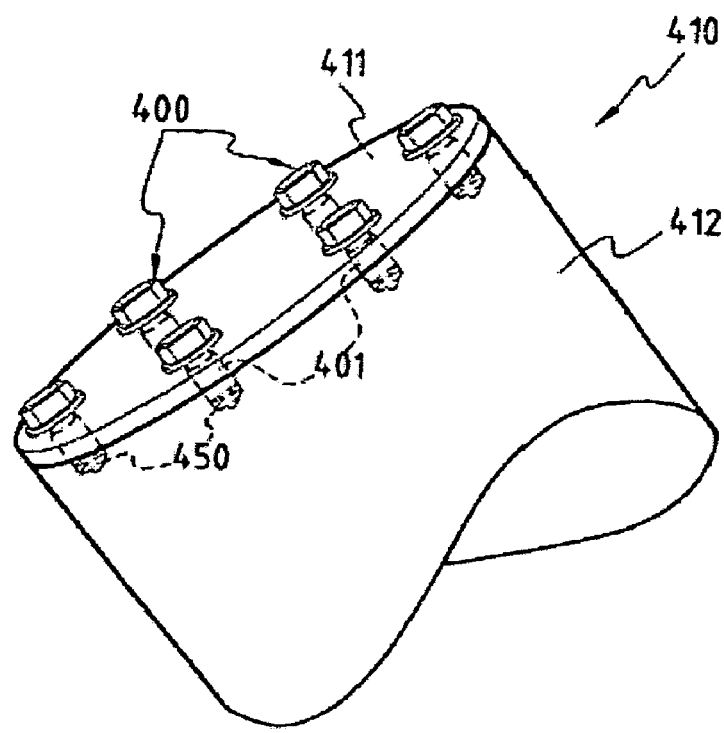
FIG. 7 is a perspective view of an example of an application of the invention.

As regards the embodiment shown in FIG. 7, it operates in a manner similar to those described in relation to FIGS. 1 to 5 and may, of course, comprise all the specific characteristics described above. In the interests of simplicity, therefore, it will not be described in further detail.

The principle of the seal is that it can only be affixed once without suffering damage. The fastening member according to the invention meets the same requirement. It can have numerous applications. FIG. 7 represents fastening members 400, of the same type as those described above, used to seal a cover 411 on a chamber 412 belonging to a container or an engine part, for example. In this case, the threaded part 450 of the fastening member 400 is screwed into a thread cut directly in the material of the part 412. Any attempt to remove the cover 411 will be detectable by an integrity check as described above.

Figure 8:
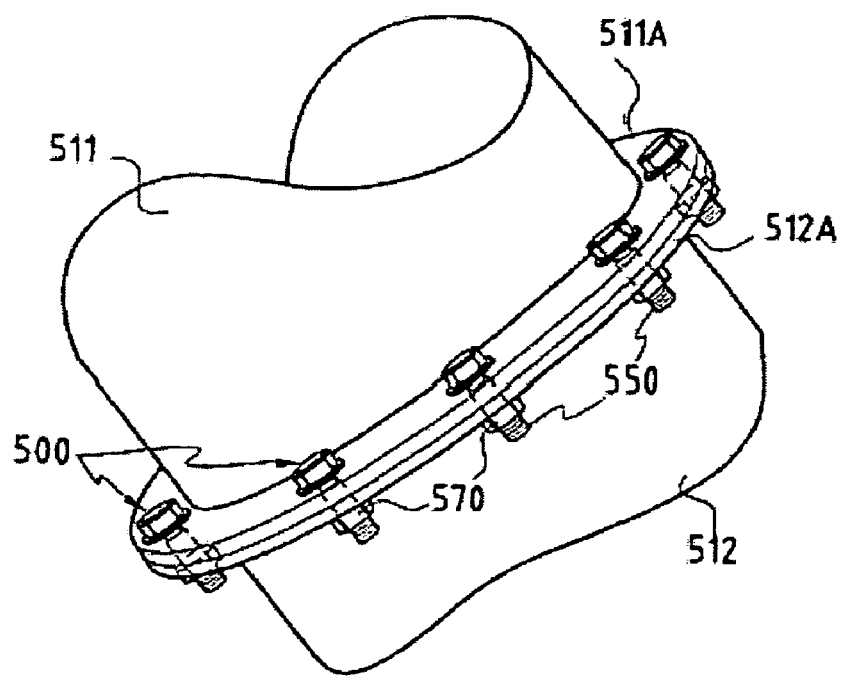
FIG. 8 is a perspective view of another example of an application of the invention.

According to another example, illustrated in FIG. 8, the fastening member can be used as the screw of a bolt. In this case, each fastening member 500 is associated with a nut 570 to enable the two elements 511 and 512 to be tightened and fixed together. Element 511 may be, for example, a lid closing a chamber in the form of the element 512. Each of the elements 511 and 512 comprises a flange 511A, 512A, clearance holes for the fastening members 500 being provided in the flanges. The integrity of the device thus formed is also guaranteed, even if an attempt is made to withdraw the fastening member by unscrewing the nut 570. This is because, to enable the nut to be unscrewed, it is necessary to hold the head of the fastening member in position to prevent it from turning with the nut. In this way, the application of a untightening effort to the nut will have the immediate effect of destroying the component by rotating the plate, thus pushing the guide finger into contact with the component.

The fastening member according to the invention offers the advantages which will now be described.

Information, such as an identification code, can be read without dismantling or damaging the fastening member when it has been put in place.

The use of a portable reader to identify and interrogate the fastening member facilitates checking operations. The reader is simply brought to each of the locations to be checked.

The data memorized in the seal can easily be stored through a simple computer serial link. The data so extracted can then be processed rapidly, which speeds up and reduces the cost of identification.

It is possible to use multi-page transponders to store a variety of information, such as information on the nature, provenance, transport stages or point of departure of the material or product sealed, which further extends the possible applications of the fastening member. When an itinerary includes a number of stages, for example, such information can be useful for determining the place or date of any tampering.

When the circuit of the transponder comprises programmable and encryptable means, it is possible to code or encrypt the data stored in the fastening member for an additional level of security.

The costs of manufacture of the fastening member are low (approximately less than 5 Euros) and its life expectancy is high (about 10 years for a fastening member with a passive transponder).

Checking the integrity of the fastening member is simple and quick: if the reader cannot detect the information memorized, this means that an attempt has been made to untighten or unscrew the member.

The invention claimed is:

1. A fastening member comprising a threaded part and a head by which said threaded part can be turned in order to tighten said fastening member in a corresponding element,
   said head being formed of a plate in one piece with said threaded part and a cap covering said plate, said cap comprising a recessed portion in which an offset is provided to form a housing,
   said cap further comprising a remotely interrogatable electronic component which comprises a data storage means,
   wherein said plate comprises a guide finger extending vertically from the side opposite said threaded part, said guide finger being arranged inside said housing to form a stop against which said cap presses in order to impart a rotational movement to said plate in a tightening direction, and
   wherein said component is held as a protrusion in said recessed portion in said housing so as to come to a stop against said guide finger during untightening of said fastening member.

2. The fastening member according to claim 1, wherein said plate comprises a first groove and said cap comprises a second groove, said first and second groves being in alignment when said cap covers said plate, wherein said fastening member comprises a ring cooperating with said first and second grooves to hold said cap axially in position on said plate.

3. The fastening member according to claim 1, wherein it further comprises a holding element for holding said electronic component in said housing.

4. The fastening member according to claim 1, wherein said cap further comprises a shearable pin arranged in said housing between the end of said component protruding into said housing and said guide finger.

5. The fastening member according to claim 1, wherein said plate displays a slightly elliptical shape to prevent said cap from rotating when no tightening or untightening force is applied.

6. The fastening member according to claim 1, wherein said cap is made of PVC.

7. The fastening member according to claim 1, wherein said threaded part and said plate are made of stainless steel.

8. The fastening member according to claim 1, wherein said electronic component is a transponder of passive type.

9. The fastening member according to claim 1, wherein said electronic component is a transponder comprising power supply means.

10. The fastening member according to claim 1, wherein said data storage means of said electronic component comprises data encryption means.

11. The fastening member according to claim 1, wherein said data storage means of said electronic component is of the programmable or multi-page type.

12. The fastening member according to claim 1, wherein it further comprises a second remotely interrogatable electronic component, said second electronic component being located in said cap outside said recessed portion.

* * * * *